US012462428B2

United States Patent
Wang et al.

(10) Patent No.: US 12,462,428 B2
(45) Date of Patent: Nov. 4, 2025

(54) SENSOR ANGULAR ALIGNMENT

(71) Applicant: GM GLOBAL TECHNOLOGY OPERATIONS LLC, Detroit, MI (US)

(72) Inventors: Hongtao Wang, Madison Heights, MI (US); Wende Zhang, Birmingham, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 18/328,862

(22) Filed: Jun. 5, 2023

(65) Prior Publication Data
US 2024/0404107 A1 Dec. 5, 2024

(51) Int. Cl.
*G06T 7/80* (2017.01)
*G01C 21/16* (2006.01)
*B60W 10/18* (2012.01)
*B60W 10/20* (2006.01)
*B60W 60/00* (2020.01)

(52) U.S. Cl.
CPC ............ *G06T 7/80* (2017.01); *G01C 21/1656* (2020.08); *B60W 10/18* (2013.01); *B60W 10/20* (2013.01); *B60W 60/00* (2020.02); *B60W 2710/18* (2013.01); *B60W 2710/20* (2013.01); *B60W 2720/106* (2013.01)

(58) Field of Classification Search
None
See application file for complete search history.

(56) References Cited

U.S. PATENT DOCUMENTS

| 9,386,302 | B2 * | 7/2016 | Zeng | G06T 7/80 |
| 11,538,188 | B1 * | 12/2022 | Cejka | G06T 7/80 |
| 2005/0280709 | A1 * | 12/2005 | Katayama | H04N 13/246 |
| | | | | 348/E13.016 |
| 2006/0290920 | A1 * | 12/2006 | Kampchen | G01S 7/4972 |
| | | | | 356/139.07 |
| 2008/0089611 | A1 * | 4/2008 | McFadyen | G06T 5/80 |
| | | | | 382/289 |

(Continued)

FOREIGN PATENT DOCUMENTS

| CN | 100573586 C | * | 12/2009 |
| CN | 109903341 A | * | 6/2019 |

(Continued)

*Primary Examiner* — Shelley Chen
(74) *Attorney, Agent, or Firm* — Ingrassia Fisher & Lorenz, LLP | IF&L (57) ABSTRACT

Methods, apparatus, and systems for sensor alignment include acquiring a translational vector, a first calibration point location and a second calibration point location, determining an expected rotational orientation in response to the translational vector, the first calibration point location and the second calibration point location, capturing an image of the a first calibration point and the second calibration point, determining a first position of the first calibration point and a second position of the second calibration point in response to the image, calculating a calculated rotational orientation in response to the first position of the first calibration point and the second position of the second calibration point, determining a calibration value in response to the calculated rotational orientation, storing the calibration value and controlling a vehicle in response to the calibration value and a subsequent image.

20 Claims, 5 Drawing Sheets

(56) References Cited

U.S. PATENT DOCUMENTS

| | | | | |
|---|---|---|---|---|
| 2015/0049193 A1* | 2/2015 | Gupta | ............... | G06T 7/85 |
| | | | | 348/148 |
| 2015/0341629 A1* | 11/2015 | Zeng | ............... | H04N 17/002 |
| | | | | 348/187 |
| 2020/0294268 A1* | 9/2020 | Weng | ............... | G06T 7/73 |
| 2022/0067967 A1* | 3/2022 | Luo | ............... | G06V 40/168 |
| 2022/0276339 A1* | 9/2022 | Ma | ............... | G01S 7/406 |
| 2022/0276360 A1* | 9/2022 | Ma | ............... | G06T 7/80 |
| 2024/0070915 A1* | 2/2024 | Leeman | ............... | G06T 7/80 |

FOREIGN PATENT DOCUMENTS

| | | | | |
|---|---|---|---|---|
| CN | 110363819 A | * | 10/2019 | ............... G06T 7/73 |
| CN | 113516722 A | * | 10/2021 | ............... G06T 3/4038 |
| CN | 113661505 A | * | 11/2021 | ............... G01C 22/02 |
| CN | 113870357 A | * | 12/2021 | ............... G06T 7/80 |
| CN | 114092552 A | * | 2/2022 | ............... G06T 7/80 |
| CN | 110176036 B | * | 3/2023 | ............... G06T 7/73 |
| CN | 110363819 B | * | 3/2023 | ............... G06T 7/73 |
| CN | 116442909 A | * | 7/2023 | ............... H04N 7/181 |
| DE | 102021204363 A1 | * | 11/2022 | ............... H04N 23/90 |
| EP | 1615047 A2 | * | 1/2006 | ............... G01S 17/86 |
| JP | H10341458 A | * | 12/1998 | |
| JP | 2004340840 A | * | 12/2004 | ............... G06T 7/593 |
| JP | 2010103730 A | * | 5/2010 | |
| JP | 2013024712 A | * | 2/2013 | |
| JP | 2020051932 A | * | 4/2020 | |
| KR | 101419721 B1 | * | 7/2014 | ............... H04N 23/71 |
| TW | 201417042 A | * | 5/2014 | ............... G06T 3/00 |

\* cited by examiner

SENSOR ANGULAR ALIGNMENT

INTRODUCTION

The present disclosure generally relates to vehicle sensor alignment systems in a vehicle calibration facility, and more particularly relates to a method and apparatus for a vehicle sensor alignment algorithm using an iterative rotational angle determination in response to a two control point calibration target.

Modern vehicles are increasingly being equipped with more and more electronic systems in order to enhance vehicle safety and performance. These electronic systems can include sensors for enabling a vehicle, such as autonomous and semi-autonomous vehicles, to sense its environment and navigate with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicle features rely on sensor data to be accurately and precisely converted into real world coordinates for data association and sensor fusion. Due to manufacturing variances and tolerances, these sensors must be calibrated to ensure that estimation of object locations proximate to the vehicle are accurate. Calibration factors can be determined to compensate for angular variations as well as rotational variations. Typically, manufacturing alignment has limited space and tight cycle time requirement so target based calibration requiring many control points uses more space and longer cycle times than is available during typical production. Thus, it would be desirable to provide a lightweight algorithm to calibrate the sensor extrinsic parameters accurately with minimum control points, thereby reducing calibration time and space required. Furthermore, other desirable features and characteristics of the present invention will become apparent from the subsequent detailed description and the appended claims, taken in conjunction with the accompanying drawings and the foregoing technical field and background.

SUMMARY

The present disclosure provides calibration systems and methods for a vision system or imaging system for a vehicle. A vehicle control system performing a vehicle control algorithm is operative to receive data from vehicle sensors, solve the alignment as a mathematical optimization problem given two or more control points in an iterative process to generate a sensor data and sensor alignment correction values with minimal space and time requirements in a high volume vehicle assembly facility or the like. In accordance with an exemplary embodiment, the vehicle sensor system includes, a camera configured to capture a first image of a first field of view, a data interface configured to receive a translational vector, a first location of a first calibration point and a second location of a second calibration point and wherein the first calibration point and the second calibration point are within the first field of view, a processor configured to determine an expected rotational orientation in response to the first location of the first calibration point and the second location of the second calibration point, to determine a first position of the first calibration point within the first image and a second position of the second calibration point within the first image, to determine a calculated rotational orientation in response to the first position of the first calibration point within the first image and the second position of the second calibration point within the first image, and to generate a calibration value in response to the calculated rotational orientation, a memory configured to store the calibration value, and a vehicle controller configured to control a host vehicle in response to the calibration value and a subsequent image captured by the camera.

In accordance with another aspect of the exemplary embodiment, wherein the translational vector, the first location of the first calibration point and the second location of the second calibration point are coordinates within a three dimensional coordinate system and wherein the processor is further operative to convert the translational vector, the first location of the first calibration point and the second location of the second calibration point into a two dimensional coordinate system.

In accordance with another aspect of the exemplary embodiment, wherein the translational vector is transmitted from a calibration station to the data interface via a wireless network.

In accordance with another aspect of the exemplary embodiment, wherein the translational vector is determined in response to a vehicle design parameter and a vehicle orientation within a calibration environment.

In accordance with another aspect of the exemplary embodiment, wherein the first calibration point and the second the second calibration point are located on a calibration target within the first field of view.

In accordance with another aspect of the exemplary embodiment, wherein a two point algorithm is used to compute the calculated rotational orientation.

In accordance with another aspect of the exemplary embodiment, wherein the processor is further operative to determine a subsequent calculated rotational orientation in response to an error of the calculated rotational orientation being greater than a threshold value.

In accordance with another aspect of the exemplary embodiment, wherein the first position of the first calibration point and the second position of the second calibration point are determined within the two dimensional coordinate system.

In accordance with another aspect of the exemplary embodiment, further including an inertial measurement unit for measuring a vehicle attitude and wherein the vehicle attitude and the translational vector are used to calculate the expected rotational orientation.

In accordance with another aspect of the exemplary embodiment, a method including acquiring, via a network interface, a translational vector, a first calibration point location and a second calibration point location, determining an expected rotational orientation in response to the translational vector, the first calibration point location and the second calibration point location, capturing, by a camera, an image of a first calibration point and a second calibration point, determining, by an image recognition algorithm, a first position of the first calibration point and a second position of the second calibration point in response to the image, calculating a calculated rotational orientation in response to the first position of the first calibration point and the second position of the second calibration point, determining a calibration value in response to the calculated rotational orientation, storing the calibration value in a memory, and controlling a vehicle in response to the calibration value and a subsequent image captured by the camera.

In accordance with another aspect of the exemplary embodiment, further including translating the translational vector, the first calibration point location and the second calibration point location from a three dimensional coordinate system to a two dimensional coordinate system.

In accordance with another aspect of the exemplary embodiment including predetermining the translational vector in response to a vehicle dimension and a camera position.

In accordance with another aspect of the exemplary embodiment, including determining the translational vector in response to the image and a lidar depth map.

In accordance with another aspect of the exemplary embodiment, including determining the translational vector in response to a vehicle attitude value detected by an inertial measurement unit.

In accordance with another aspect of the exemplary embodiment, including determining the calculated rotational orientation in response to a two point algorithm.

In accordance with another aspect of the exemplary embodiment, including recalculating the calibration value in response a subsequent angular difference between a subsequent calculated rotational orientation and a the calculated rotational orientation exceeding a threshold value.

In accordance with another aspect of the exemplary embodiment, wherein the first calibration point and the second calibration point are located on a calibration target within a manufacturing calibration test station.

In accordance with another aspect of the exemplary embodiment, wherein the calculated rotational orientation is determined in response to a small angle approximation.

In accordance with another aspect of the exemplary embodiment, a camera calibration system including an optical sensor for capturing a two dimensional image of a field of view, a network interface for receiving a translational vector, a first location of a first calibration point and a second location of a second calibration point and wherein the first calibration point and the second calibration point are within the field of view, a processor for determining an expected rotational orientation in response to the first location of the first calibration point and the second location of the second calibration point, for determining a first position of the first calibration point within the two dimensional image and a second position of the second calibration point within the two dimensional image, for determining a calculated rotational orientation in response to the first position of the first calibration point within the two dimensional image and the second position of the second calibration point within the two dimensional image; and for generating a calibration value in response to the calculated rotational orientation, a memory for storing the calibration value, and a vehicle controller for controlling a host vehicle in response to the calibration value and a subsequent two dimensional image captured by the optical sensor.

In accordance with another aspect of the exemplary embodiment, wherein the translational vector, the first location of the first calibration point and the second location of the second calibration point are coordinates within a three dimensional coordinate system and wherein the processor is further operative to convert the translational vector, the first location of the first calibration point and the second location of the second calibration point into a two dimensional coordinate system.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
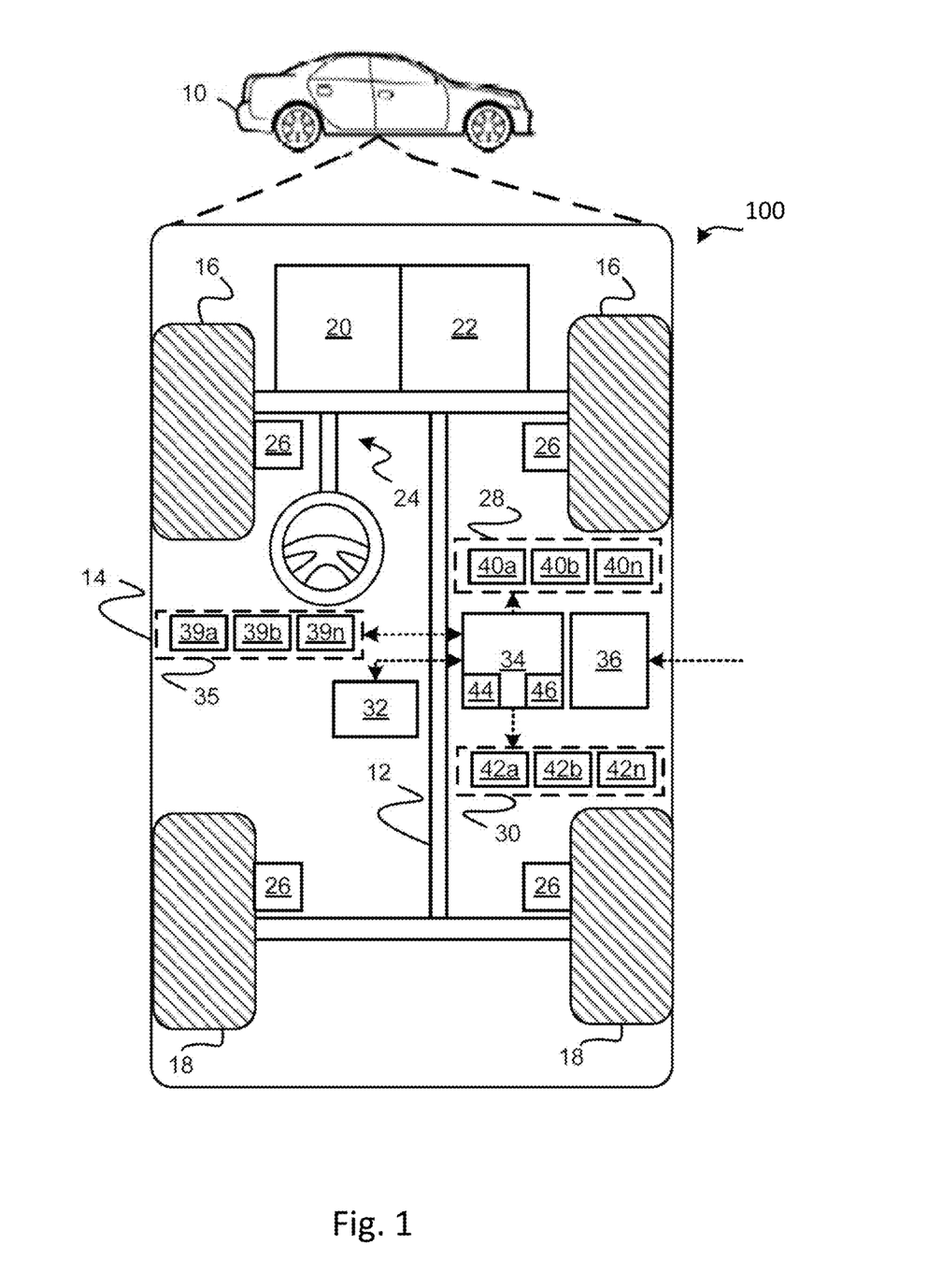
FIG. 1 shows a vehicle system for use of the sensor alignment algorithm in accordance with various embodiments.

Turning now to FIG. 1, an exemplary system 100 for robust sensor alignment is shown in accordance with various embodiments. The exemplary system 100 includes a vehicle 10 having a plurality of sensing devices 40a-40n, a propulsion system 20, a transmission system 22, a steering system 24, a brake system 26, a sensor system 28, an actuator system 30, at least one data storage device 32, at least one controller 34, and a communication system 36.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the vehicle 10 may be a non-autonomous vehicle and is not limited to the present examples.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

In various embodiments, the sensing devices 40a-40n are disposed at different locations of the vehicle 10. In exemplary embodiments described herein, one or more of the sensing devices 40-40n are realized as lidar devices. In this regard, each of the sensing devices 40a-40n may include or incorporate one or more lasers, scanning components, optical arrangements, photodetectors, and other components suitably configured to horizontally and rotatably scan the environment in the vicinity of the vehicle 10 with a particular angular frequency or rotational velocity. In exemplary embodiments described herein, one or more of the sensing devices 40a-40n are realized as optical cameras configured to capture images of the environment in the vicinity of the vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
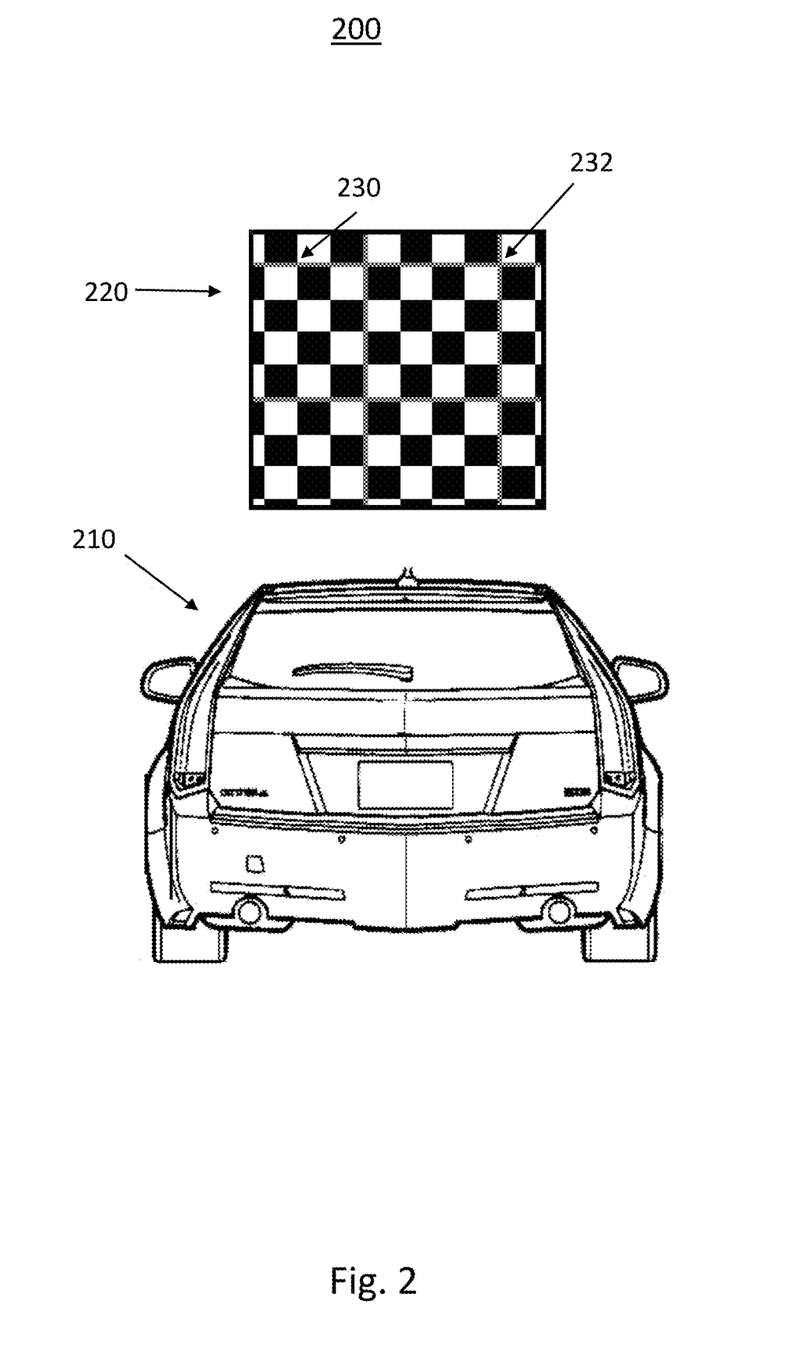
FIG. 2 shows an exemplary environment for performing a sensor alignment algorithm using a two control point calibration arrangement in accordance with various embodiments.

Still referring to FIG. 1, in exemplary embodiments, the communication system 36 is configured to wirelessly communicate information to and from other entities 48, such as but not limited to, other vehicles ("V2V" communication) infrastructure ("V2 I" communication), remote systems, personal devices, and or calibration stations (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. In various embodiments, the data storage device 32 stores calibrations for use in aligning the sensing devices 40a-40n. In various embodiments, one or more of the calibrations are estimated as extrinsic parameter using the methods and systems described herein. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In various embodiments, one or more instructions of the controller 34 are embodied in the control system 100 and, when executed by the processor 44, cause the processor 44 to perform the methods and systems that dynamically align the sensor devices by updating calibrations stored in the data storage device 32 as described in greater detail below.

In accordance with various embodiments, the controller 34 implements an autonomous driving system (ADS). Software and/or hardware components of the controller 34 (e.g., processor 44 and computer-readable storage device 46) are utilized to provide an autonomous driving system that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, the autonomous driving system can include a computer vision system, a positioning system, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. In various embodiments, the computer vision system 74 receives information from and/or implements the control system 100 described herein.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

According to some exemplary embodiments, the control system shown generally at 100 is associated with a vehicle 10. In general, the control system 100 selectively aligns two sensors of the vehicle 10 by estimating extrinsic parameters. As will be discussed in more detail, the estimating is based on a method that utilizes a mathematical optimization problem given a group of Lidar-camera control points with a highly flexible 3D-2D correspondence requirement. In various embodiments, the two sensors include a lidar sensor and a camera sensor. As can be appreciated, other sensors can be implemented in various embodiments.

Turning now to FIG. 2, an exemplary environment 200 for the robust sensor alignment algorithm is shown in accordance with various embodiments. The exemplary environment 200 can be a calibration station in a vehicle manufacturing facility and can include a test vehicle 210 and a calibration target 220 with a first calibration point 230 and a second calibration point 232. In some exemplary embodiments, the calibration target 220 may be a checkerboard pattern calibration target or any calibration target having two or more calibration points with known locations within the exemplary environment 200. In this exemplary description, a camera employed in a vehicle platform is described, but the proposed systems and methods can be employed for calibrating any number of sensors in any number of platforms and is not limited to cameras in automotive applications.

In some exemplary embodiments, optical sensor calibration in a manufacturing environment can be performed using the calibration target 220 with the test vehicle 210 being positioned at a known location and orientation. The calibration target 220 can be specially designed object that has a known shape and size and can be located at a known location with respect to the test vehicle location. In addition, the calibration target 220 will have a plurality of calibration points, such as the first calibration point 230 and the second calibration point 232 with known locations on the calibration target 220. In some exemplary embodiments, the optical sensor can be a camera used to capture images of the calibration target and the resulting data used to adjust the camera's calibration settings.

The system can first be configured to acquire a translation vector corresponding to the test vehicle 210 and the calibration environment 220. The translation vector is a 3D vector that describes the position of the sensor's center of projection with respect to the calibration environment coordinate system. The translation vector can be acquired from a calibration station controller, or the like, and can determined in response to vehicle design parameters, such as designed sensor position and orientation as determined using vehicle design specifications and the like, and a test vehicle location and orientation within the calibration environment 220. The test vehicle location can be determined in response to external sensors communicably coupled to the calibration station controller to determine precise location and orientation information of the test vehicle 210. In response to this determined vehicle location and orientation information, the calibration station controller can determine a translation vector and couple this translation vector to a sensor system processor in the test vehicle 210.

In some exemplary embodiments, the translation vector can be calculated by the processor 44 within the test vehicle 210 in response to one or more images or other sensor data captured by test vehicle sensors using a set of known 3D points and their corresponding 2D image points. The known 3D points are placed in a known location in the calibration environment and corresponding 2D image points are obtained by capturing images or detections of the known 3D points with one or more sensors. Sensor calibration algorithms can then use these known points to estimate intrinsic and extrinsic parameters of the camera. Once the intrinsic and extrinsic parameters have been estimated, the calibration translation vector can be calculated. The calibration translation vector can be a difference between the coordinates of the known 3D points and their corresponding coordinates in the camera coordinate system.

After acquisition of the translation vector, the sensor integral to the test vehicle 210 is used to capture an image of the calibration target 220. Image processing techniques are performed on the image to detect positions of the first calibration point 230 and the second calibration point 232 within the image. The first calibration point 230 and the second calibration point 232 are next located in a camera image coordinate and a small angle approximation and a two point algorithm is applied to compute the rotational orientation angles of the first calibration point 230 and the second calibration point 232. The small-angle approximations can be used to approximate the values of the main trigonometric functions, provided that the angle in question is small. Equations representative of the rotational orientation angles for each of the calibration points are used to solve for remaining unknown values using a least squares method or the like. In some exemplary embodiments, the rotational orientation angles correspond to pitch, roll, and yawl for the sensor and/or rotational around a three dimensional coordinate system originating at the sensor and/or vehicle location.

In some exemplary embodiments, an attitude of the test vehicle 210 can be determined in response to vehicle inertial measurement units (IMU) data and an expected rotational orientation angle between the first calibration point 230 and the second calibration point 232 is determined. The computed rotational orientation angle is compared to the expected rotational orientation angle to determine a calibration data. In case of large initial error, the system is configured to reconvert 3D targets into camera image coordinates with known translation vector and the newly determined rotational orientation angle, capture a new image and perform two dimensional feature extraction and reapply the two point algorithm to determine a refined rotational orientation angle. This process can be repeated until a difference between the determined rotational orientational angle and a newly determined rotational orientational angle is less than a threshold value. In some exemplary embodiments, this threshold can be between one thousandth of a degree and one millionth of a degree. The calibration data is then used to compensate for any differences between the expected rotational orientation angle and the computed rotational orientation angle.

Figure 3:
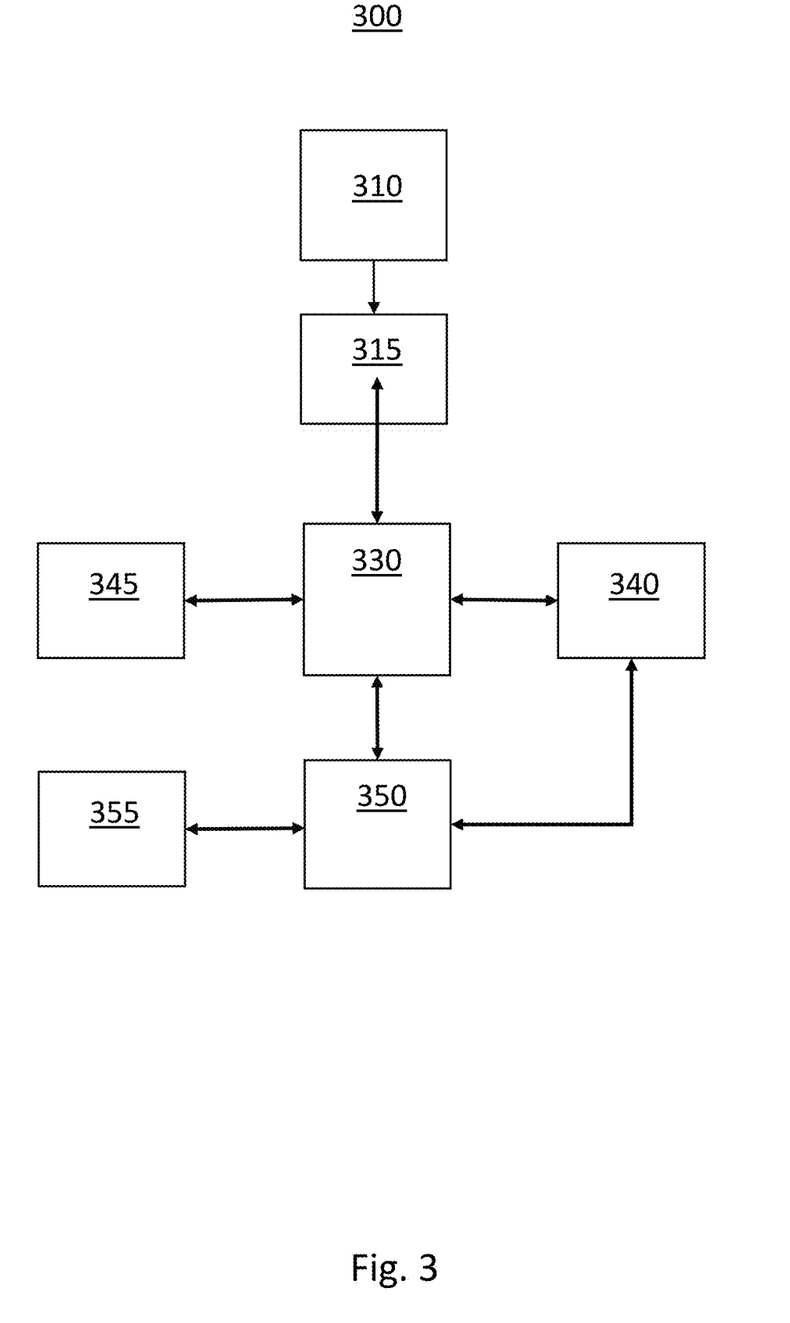
FIG. 3 shows an exemplary block diagram of a system for performing a sensor alignment algorithm using a two control point calibration arrangement in accordance with various embodiments.

Turning now to FIG. 3, an exemplary block diagram for a system 300 for robust sensor alignment algorithm is shown in accordance with various embodiments. The exemplary system 300 includes a camera 310, an image processor 315, a sensor system processor 330, a memory 340, a network interface 345, an IMU 355 and a vehicle controller 350. When images captured by vehicular cameras are used for determination of object locations for assisted driving applications, camera orientation and rotational errors can be introduced due to manufacturing variations in the camera or the vehicle body 14, as well as errors introduced due to installation and inconsistencies with vehicle positioning in calibration test stations. To address this problem, a robust method for camera alignment calibration is provided. This alignment algorithm is not restricted to cameras and can be employed for calibration of various optical sensors and the like. The vehicle controller 350 can be communicatively coupled to the sensor system processor 330 and the IMU 355. The IMU 355 can be configured to determine one or more accelerations, pitch, roll and yaw of the test vehicle. These values can be coupled to the vehicle controller 350 for determination of a test vehicle attitude. The test vehicle attitude can be calculated by the sensor processing system 330 and can be used in establishing a translation vector and/or an expected rotational angle.

The camera 310 can be an optical sensing device having one or more charge-coupled devices (CCD) or complementary metal-oxide-semiconductor (CMOS) sensors for converting light that enters the camera into an electrical signal that can be stored as an image file or presented on an image display or monitor. The size of the sensor, the pixel size, the noise, the dynamic range, and the color reproduction all affect the image quality of a digital camera sensor. The camera 310 is typically recessed into, or mounted to, an outer surface of a vehicle and is used to capture light from a field of view (FOV) of the camera. Typically, a vehicle will have a plurality of cameras that have overlapping FOVs such that a 360 degree surround view can be generated by stitching together images from the multiple cameras. Vehicle mounted cameras 310 can be used for traffic sign recognition, video-based distance control, road guidance, object detection and the like. In some exemplary embodiments, the camera 310 can capture a high definition image which is then coupled to the image processor 315 for object detection. The image processor 315 may run image processing algorithms in response to the image, for detecting and classification of objects within the FOV. In some exemplary embodiments, the image processor 315 may be integral to the camera 310, may be a discrete component, or may form part of a sensor system processor 330 or the like.

The network interface 345 can be configured to be communicatively coupled to a data network, such as a wireless local area network, for transmitting and receiving data. In some exemplary embodiments, the network interface 345 can be configured to receive a translation vector from a calibration control station or other data source via the wireless network. The translation vector is a 3D vector that describes the center of projection of the camera with respect to the calibration environment coordinate system.

The detected image information can be coupled from the image processor 315 to a sensor system processor 330. In some exemplary embodiments, the sensor system processor 330, or comparable processor or system for processing sensor data, can receive the extracted control points from the image processor 315. The sensor system processor 330 is configured to acquire the translation vector via the network interface 345. In response to acquiring the translation vector, the sensor system processor 330 can detect two or more control points in response to the control points detected by the image processor 315. These two control points can be points on a calibration target or the like having known positions within the sensor calibration environment. An angle of rotation is determined in response to the two calibration points, the calibration point locations in the known 3D coordinate system and the calibration points in the 2D camera coordinate system. The sensor rotational angles are then determined in response to equations generated from each of the calibration points to solve for the remaining unknown values. The resulting calibration data can be stored in a memory 340 which can then be accessed by the vehicle controller 350 for control of the vehicle according to an advanced assisted driving algorithm, such as a lane centering operation, adaptive cruise control, or full autonomous vehicle operation. In the case of a large initial error between the determined angles of rotation and an initial or expected rotational angles, the system is configured to capture a subsequent image of the calibration target, determine the location of two or more control points on the calibration target and determine a subsequent angle of rotation. This subsequent angle of rotation is compared against the previously determined angle of rotation and calibration data is generated in response to this comparison.

This process can be repeated until a difference between the determined rotational orientational angle and a newly determined rotational orientational angle is less than a threshold value. In some exemplary embodiments, this threshold can be between one thousandth of a degree and one millionth of a degree.

In some exemplary embodiments, the vehicle controller 350 can be communicatively coupled to the sensor system processor 330 and the IMU 355. The IMU 355 can be configured to determine one or more accelerations, pitch, roll and yaw of the test vehicle. These values can be coupled to the vehicle controller 350 for determination of a test vehicle attitude. The test vehicle attitude can be calculated by the sensor processing system 330 and can be used in establishing the translation vector and/or an expected rotational angle.

Figure 4:
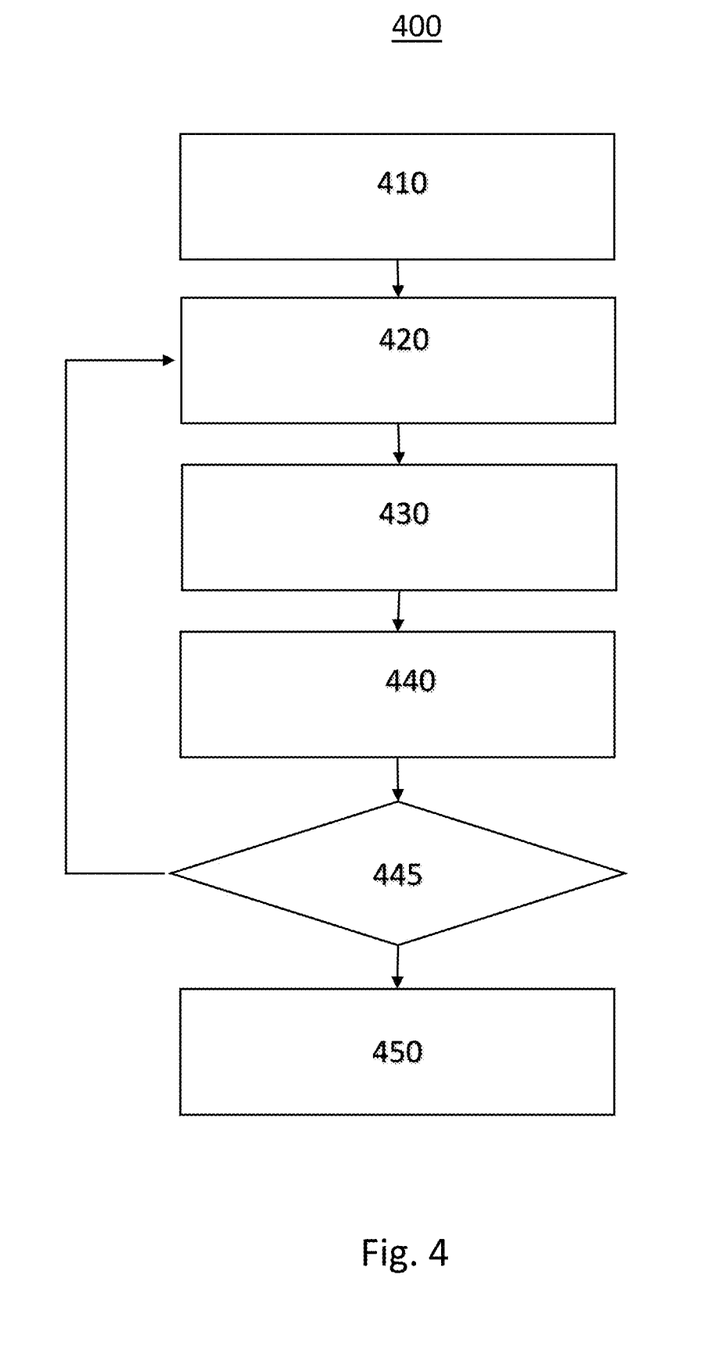
FIG. 4 shows a flowchart illustrating a method for performing a sensor alignment algorithm using a two control point calibration arrangement in accordance with various embodiments.

Turning now to FIG. 4, a flow chart illustrating an exemplary implementation of a method 400 for performing a robust sensor alignment algorithm in accordance with various embodiments is shown. While the following method 400 is described as a series of sequential steps, some of the steps may be performed in parallel or non-sequentially, such as capture and processing of the image data and acquisition of the translation vector and the like.

The method 400 is first operative to acquire 410 a translation vector and location of targets in the calibration environment. The translation vector is a vector determined in response to a physical relationship between a vehicle sensor, such as a camera, to a coordinate system within which the environment surrounding the vehicle is located. An expected translation vector corresponds to a sensor's expected center of field of view and is determined in response to vehicle design parameters, such as designed sensor position and orientation as determined using vehicle design specifications and the like. The location of the targets and/or locations of the calibration points can be provided in a 3D coordinate system.

The method 400 is next operative to convert 420 the 3D target locations into a camera coordinate system with a known translation vector and an expected rotational orientation between the two or more calibration points. Knowing the 3D coordinates for each of the target locations and the position and orientation of the camera within the calibration environment, the calibration points can be projected onto a 2D plane. This projection results in an expected translational vector and an initial rotational orientation in response to each of the calibration points.

The method 400 next captures 430 an image of the calibration environment including the calibration target and one or more calibration points. An image processing algorithm is performed to extract features from the image and a 2D location in the camera coordinate system is determined for each of the calibration points. The method 400 next performs 440 an algorithm to determine orientation angles in response to the calibration points. In some exemplary embodiments, the orientational angles can correspond to the yawl, roll and pitch of the sensor and/or vehicle. In some exemplary embodiments, the orientation angles correspond to rotation around the X, Y, and Z coordinates of the 3D space.

In some exemplary embodiments, the orientational angles can be determined by assuming a small angle approximation and apply a 2-point algorithm to compute the orientation angles in response to the following relationship for each of the calibration points.

$$\begin{bmatrix} u \\ v \\ 1 \end{bmatrix} = K[R|T] \begin{bmatrix} X_v \\ Y_v \\ Z_v \\ 1 \end{bmatrix}$$

Where, $$X = \begin{bmatrix} X_v \\ Y_v \\ Z_v \end{bmatrix}$$

is the know 3D target in the vehicle coordinate

T is the known translation vector from vehicle to camera coordinate, assume $$T = \begin{bmatrix} t_1 \\ t_2 \\ t_3 \end{bmatrix}$$

K is the know camera intrinsic parameters $$x = \begin{bmatrix} u \\ v \\ 1 \end{bmatrix}$$

is the known projected 2D image coordinate

To simplify the equation $$\text{set } K^{-1}x = M = [R|T] \begin{bmatrix} X_v \\ Y_v \\ Z_v \\ 1 \end{bmatrix}$$

Solving for the rotational vector [R] for a single calibration point results in two equations with three unknown values. Solving for two calibration points results in four equations with three unknowns. The three unknowns, such as pitch, roll and yawl, can then be solved using a method of least squares or the like to determine the orientational angles.

In the case of a large initial error of R from a known translational vector and an initial rotational vector, the method is configured to recompute 420 the target locations in response to the determined translational vector and the expected orientation angle using the determined orientation angle. The method 400 then captures 430 a subsequent image and recomputes a subsequent orientation angle. If the determined error between the expected orientation angle and the determined orientation angle is less than a threshold error value 445, the method 400 then stores 450 a calibration value calculated in response to the error value. This calibration value is used to compensate for any variations in rotational alignment of the camera mounted to the vehicle surfaces.

Figure 5:
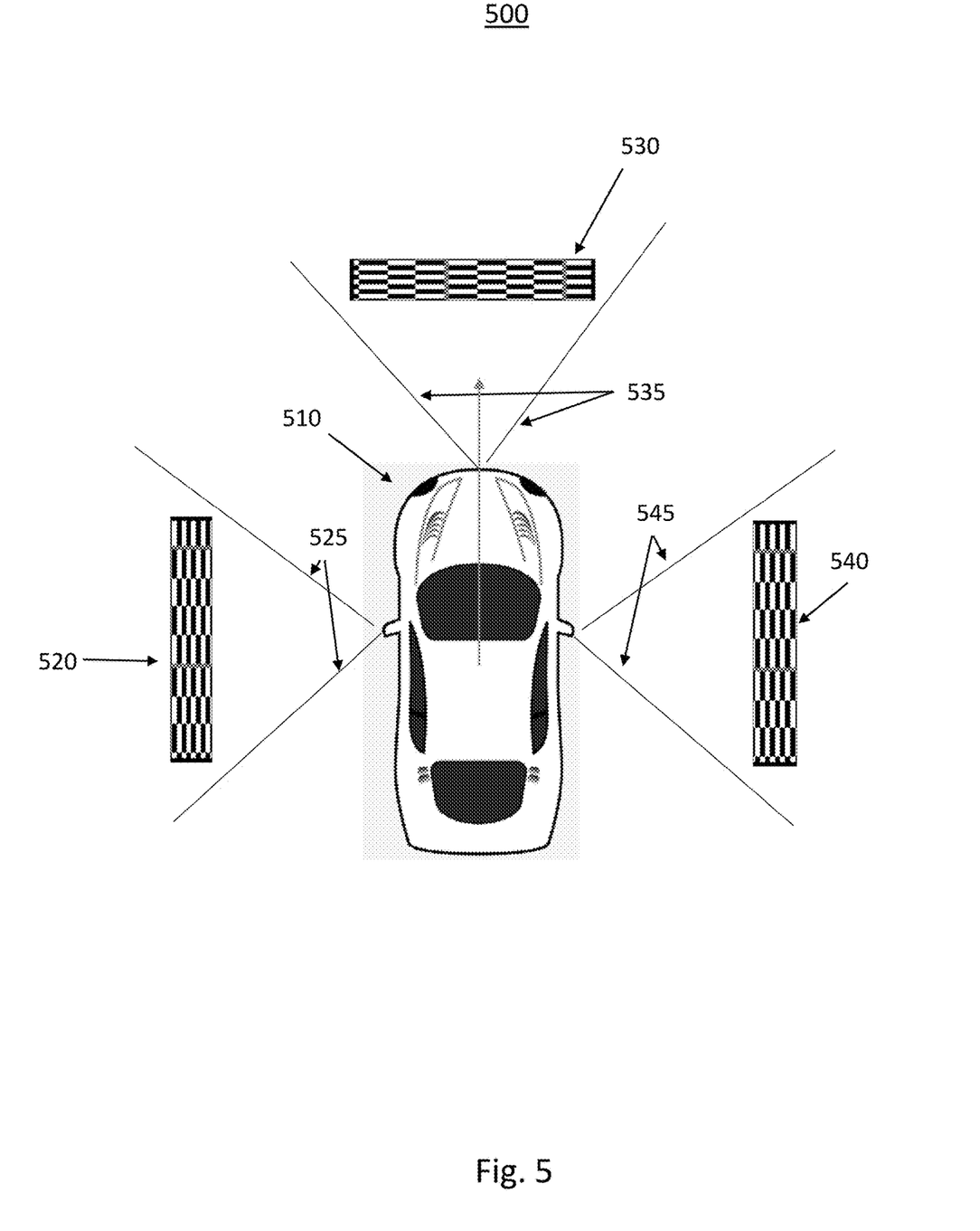
FIG. 5 shows an exemplary environment for performing a multi sensor alignment algorithm in a vehicle application in accordance with various embodiments.

Turning now to FIG. 5, an exemplary environment 500 for simultaneously calibrating multiple vehicle surface mounted cameras in a calibration station in a manufacturing environment in accordance with various embodiments is shown. The exemplary environment 500 shows a test vehicle 510 having a plurality of optical sensors having a first field of view 525, a second field of view 535 and a third field of view 545. The first field of view 535 can cover a first calibration target 520, the second field of view 535 covers a second calibration target 530 and the third field of view 545 covers a third calibration target 540.

In some exemplary embodiments, the sensor system processor of the test vehicle 510 acquires a first determined translational vector and calibration point locations for each of the optical sensors and/or calibration targets 520, 530, 540. The calibration point locations are converted from a 3D coordinate system to a camera coordinate system for each of the respective cameras. An expected rotational orientation is then calculated for each of the pairs of calibration targets for each of the cameras. In some exemplary embodiments, a first translational vector and first expected rotational orientation is determined for the first camera, a second determined translational vector and a second expected rotational orientation is determined for the second camera, and a third determined translational vector and a third expected rotational orientation is determined for the third camera.

Images are captured by the first camera, second camera and third camera of the first field of view 525, the second field of view 535 and the third field of view 545 respectively. Image recognition algorithms are performed on each of the images to determine locations of the calibration points for each of the calibration targets in 2D camera coordinates. Rotational orientations are calculated for each set of calibration points and an error is calculated between the calculated rotational orientations and their respective expected rotational orientations. Calibration values are calculated for each of the cameras in response to the calculated errors. These calibration values are then stored in a memory and are used by a sensor system processor, or the like, for compensating for variations in orientation for each of the cameras when used to determine object locations in an environment proximate to the test vehicle 510, such as for performing advanced driver assistance algorithms or the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
a camera configured to capture a first image of a first field of view;
a data interface configured to receive a translational vector, a first location of a first calibration point and a second location of a second calibration point and wherein the first calibration point and the second calibration point are within the first field of view;
a processor configured to determine an expected rotational orientation in response to the first location of the first calibration point and the second location of the second calibration point, to determine a first position of the first calibration point within the first image and a second position of the second calibration point within the first image, to determine a calculated rotational orientation in response to the first position of the first calibration point within the first image and the second position of the second calibration point within the first image and the second position of the second calibration point within the first image; and to generate a calibration value in response to the calculated rotational orientation;
a memory configured to store the calibration value; and
a vehicle controller configured to control a host vehicle in response to the calibration value and a subsequent image captured by the camera.

2. The apparatus of claim 1 wherein the translational vector, the first location of the first calibration point and the second location of the second calibration point are coordinates within a three dimensional coordinate system and wherein the processor is further operative to convert the translational vector, the first location of the first calibration point and the second location of the second calibration point into a two dimensional coordinate system.

3. The apparatus of claim 1 wherein the translational vector is transmitted from a calibration station to the data interface via a wireless network.

4. The apparatus of claim 1 wherein the translational vector is determined in response to a vehicle design parameter and a vehicle orientation within a calibration environment.

5. The apparatus of claim 1 wherein the first calibration point and the second the second calibration point are located on a calibration target within the first field of view.

6. The apparatus of claim 1 wherein a two point algorithm is used to compute the calculated rotational orientation.

7. The apparatus of claim 1 wherein the processor is further operative to determine a subsequent calculated rotational orientation in response to an error of the calculated rotational orientation being greater than a threshold value.

8. The apparatus of claim 1 wherein the first position of the first calibration point and the second position of the second calibration point are determined within the two dimensional coordinate system.

9. The apparatus of claim 1 further including an inertial measurement unit for measuring a vehicle attitude and wherein the vehicle attitude and the translational vector are used to calculate the expected rotational orientation.

10. A method comprising:
capturing, by a first camera, a first image of a first field of view;
receiving, by a data interface, a translational vector, a first location of a first calibration point and a second location of a second calibration point and wherein the first calibration point and the second calibration point are within the first field of view;
determining, by a processor, an expected rotational orientation in response to the first location of the first calibration point and the second location of the second calibration point, to determine a first position of the first calibration point within the first image and a second position of the second calibration point within the first image, to determine a calculated rotational orientation in response to the first position of the first calibration point within the first image and the second position of the second calibration point within the first image; and to generate a calibration value in response to the calculated rotational orientation;
storing, in a memory, the calibration value; and
controlling, by a vehicle controller, a host vehicle in response to the calibration value and a subsequent image captured by the camera.

11. The method of claim 10 further including translating the translational vector, the first calibration point location and the second calibration point location from a three dimensional coordinate system to a two dimensional coordinate system.

12. The method of claim 10 including predetermining the translational vector in response to a vehicle dimension and a camera position.

13. The method of claim 10, including determining the translational vector in response to the image and a lidar depth map.

14. The method of claim 10, including determining the translational vector in response to a vehicle attitude value detected by an inertial measurement unit.

15. The method of claim 10, including determining the calculated rotational orientation in response to a two point algorithm.

16. The method of claim 10, including recalculating the calibration value in response a subsequent angular difference between a subsequent calculated rotational orientation and the calculated rotational orientation exceeding a threshold value.

17. The method of claim 10 wherein the first calibration point and the second calibration point are located on a calibration target within a manufacturing calibration test station.

18. The method of claim 10, wherein the calculated rotational orientation is determined in response to a small angle approximation.

19. A camera calibration system comprising:
   an optical sensor for capturing a two dimensional image of a field of view;
   a network interface for receiving a translational vector, a first location of a first calibration point and a second location of a second calibration point and wherein the first calibration point and the second calibration point are within the field of view;
   a processor for determining an expected rotational orientation in response to the first location of the first calibration point and the second location of the second calibration point, for determining a first position of the first calibration point within the two dimensional image and a second position of the second calibration point within the two dimensional image, for determining a calculated rotational orientation in response to the first position of the first calibration point within the two dimensional image and the second position of the second calibration point within the two dimensional image; and for generating a calibration value in response to the calculated rotational orientation;
   a memory for storing the calibration value; and
   a vehicle controller for controlling a host vehicle in response to the calibration value and a subsequent two dimensional image captured by the optical sensor.

20. The camera calibration system of claim 19, wherein the translational vector, the first location of the first calibration point and the second location of the second calibration point are coordinates within a three dimensional coordinate system and wherein the processor is further operative to convert the translational vector, the first location of the first calibration point and the second location of the second calibration point into a two dimensional coordinate system.

* * * * *